US012503165B2

(12) United States Patent
Rai et al.

(10) Patent No.: US 12,503,165 B2
(45) Date of Patent: Dec. 23, 2025

(54) INTEGRATED ENERGY ABSORBING CASTINGS

(71) Applicant: Tesla, Inc., Austin, TX (US)

(72) Inventors: Adip Rai, San Francisco, CA (US); Sachin Shrimant Sawant, Mountain View, CA (US); Petter Winberg, Lerum (SE); Malcolm Burgess, Mountain View, CA (US); Tom Spencer, Amsterdam (NL); Pall Kornmayer, Sunnyvale, CA (US); Grant Pattinson, Mountain View, CA (US); Paul D. Edwards, Seattle, WA (US); Carlo Rinaldi, Tracy, CA (US); Alexandre Reikher, Pleasanton, CA (US); Charlie Kuehmann, Rolling Hills Estates, CA (US); Daniel Moll, Pleasanton, CA (US)

(73) Assignee: Tesla, Inc., Austin, TX (US)

( * ) Notice: Subject to any disclaimer, the term of this patent is extended or adjusted under 35 U.S.C. 154(b) by 204 days.

(21) Appl. No.: 18/007,319

(22) PCT Filed: Aug. 5, 2021

(86) PCT No.: PCT/US2021/044780
§ 371 (c)(1),
(2) Date: Jan. 30, 2023

(87) PCT Pub. No.: WO2022/031991
PCT Pub. Date: Feb. 10, 2022

(65) Prior Publication Data
US 2023/0373563 A1 Nov. 23, 2023

Related U.S. Application Data

(60) Provisional application No. 63/062,728, filed on Aug. 7, 2020.

(51) Int. Cl.
B62D 21/15 (2006.01)
B62D 25/08 (2006.01)
B62D 29/00 (2006.01)

(52) U.S. Cl.
CPC .......... *B62D 21/152* (2013.01); *B62D 25/08* (2013.01); *B62D 29/008* (2013.01)

(58) Field of Classification Search
CPC ...... B62D 21/03; B62D 21/15; B62D 21/152; B62D 25/08; B62D 25/085; B62D 29/008
(Continued)

(56) References Cited

U.S. PATENT DOCUMENTS 5,250,125 A 10/1993 Koch et al.
6,273,486 B1 * 8/2001 Ezzat ................ B62D 27/00
296/203.02
(Continued)

FOREIGN PATENT DOCUMENTS

CN 108045442 5/2018
CN 108045442 A * 5/2018 ......... B62D 25/2027
(Continued)

OTHER PUBLICATIONS

International Search Report and Written Opinion dated Nov. 16, 2021 in Application No. PCT/US2021/044780.
(Continued)

*Primary Examiner* — Jason S Daniels
(74) *Attorney, Agent, or Firm* — Schwegman Lundberg & Woessner, P.A.

(57) ABSTRACT

An integrated energy absorbing system of a vehicle with a front integrated energy absorbing casting and a back integrated energy absorbing casting. Each front and back casting
(Continued)

is a single unified casting that makes up the integrated energy absorbing system. Ribbed sections such as "I" sections and "C" sections make up the castings and are formed from a variety of different techniques and/or formings such as cutout, waveform profile, tapering, flaring and/or rib spacing. Additional sections such as closed section castings may also be integrated in the integrated energy absorbing system.

24 Claims, 15 Drawing Sheets

(58) Field of Classification Search
USPC .......................... 296/197.09, 187.11, 193.09
See application file for complete search history.

(56) References Cited

U.S. PATENT DOCUMENTS

| | | | |
|---|---|---|---|
| 6,666,501 | B1 | 12/2003 | Logan et al. |
| 7,677,649 | B2 | 3/2010 | Hedderly |
| 10,000,238 | B2 * | 6/2018 | Buschjohann ......... B62D 21/08 |
| 11,260,913 | B2 * | 3/2022 | Hong ..................... B62D 25/04 |
| 2015/0298739 | A1 | 10/2015 | Buschjohann et al. |
| 2019/0176898 | A1 | 6/2019 | Nishii et al. |
| 2019/0217380 | A1 | 7/2019 | Kallas |
| 2025/0289502 | A1 | 9/2025 | Rai et al. |

FOREIGN PATENT DOCUMENTS

| | | | |
|---|---|---|---|
| CN | 207916978 U | 9/2018 | |
| CN | 110626432 A | 12/2019 | |
| CN | 116323374 | 6/2023 | |
| DE | 102007024172 A1 | 11/2008 | |
| DE | 102008062008 A1 * | 6/2010 | ............. B62D 25/08 |
| DE | 102014221852 A1 | 4/2016 | |
| EP | 4192721 | 10/2024 | |
| HK | 40092883 | 12/2023 | |
| JP | H06286652 | 10/1994 | |
| JP | H06329050 | 11/1994 | |
| JP | 2005537183 | 12/2005 | |
| JP | 2016120518 | 7/2016 | |
| JP | 2023537494 | 9/2023 | |
| KR | 20230047110 | 4/2023 | |
| WO | WO 00/07867 | 2/2000 | |
| WO | 2004024538 | 3/2004 | |
| WO | 2005056372 | 6/2005 | |
| WO | 2015001928 | 1/2015 | |
| WO | WO-2017098182 A1 | 6/2017 | |
| WO | WO 19/204350 | 10/2019 | |
| WO | 2022031991 | 2/2022 | |

OTHER PUBLICATIONS

"International Application Serial No. PCT US2021 044780, International Preliminary Report on Patentability mailed Feb. 16, 2023", 8 pgs.

"European Application Serial No. 21770336.2, Response filed Sep. 29, 2023 to Communication pursuant to Rules 161(1) and 162 EPC filed Mar. 30, 2023", 42 pgs.

"European Application Serial No. 21770336.2, Intention to grant mailed Apr. 5, 2024", 41 pgs.

"European Application Serial No. 24195268.8, Extended European Search Report mailed Jan. 14, 2025", 5 pgs.

"Druckguss Diecast", w/English machine translation Wikipedia Artikel [Online] Retrieved from the internet: <https://de.wikipedia.org/wiki/Druckguss<, (Jun. 22, 2018), 11 pgs.

"EP Application No. 21770336.2 Communication of a notice of opposition mailed on Jul. 9, 2025", 55 pgs.

Alessandro, Paiola, "The Rer Underbody of the Tesla Model Y II sottoscocca posteriore della Tesla Model Y", (,Der hintere Unterboden des Tesla Model Y) w/English Translation [Online] Retrieved from the internet: <https://www.autotecnia.org/sottoscocca-posteriore-tesla-model-y<, (May 1, 2020), 5 pgs.

Baylaneicek, Berk, "Tesla, Model 3 ile Model Y Arasindaki Muhendislik Farklarini Aciklad", w/English Translation [Online] Retrieved from the internet: <https://www.webtekno.com/tesla-model-3-y-muhendisli k-farklarini-acikladi-h91457.html>, (May 1, 2020), 5 pgs.

Bengt, Halvorson, "Tesla aims to scale up Model Y after profitable Q1, but delays Semi deliveries to 2021", [Online] Retrieved from the internet: <https://www.greencarreports.com/news/1128002_tesla-aims-toscale-up-mode l-y-after-profitable q 1-but-delays-semi-deliveries-to-2021>, (Apr. 29, 2020), 7 pgs.

Charles, Morris, "In Model Y, Tesla replaces 70 underbody parts with one casting", [Online] Retrieved from the internet: <https://chargedevs.com/newswire/in-model-y-tesla-replaces-70-underbody-parts-with-one-casting/>, (May 4, 2020), 7 pgs.

IPG, "ItalPresseGauss has added a new model to its popular TF Series of high-end toggle-free die casting machines: the TF 5600, with a closing force of up to 56 tonnes", with English translation [Online] Retrieved from the internet: <https://www.ita l pressegauss. com/de-de/whatsnew/news-and-events/italpresse-gauss-expands-tf-series>, (Jan. 10, 2018), 4 pgs.

LQTIDAR, Ali, "This car should be a wakeup call for any manufacturer'—Model Y teardown verdict", [Online]Retrieved from the internet: <https://www.greencarreports.com/news/1128002_tesla-aims-to-scale-up-mode l-y-after-profitable-q 1-but-delays-semi-deliveries-to-201>, (May 19, 2020), 5 pgs.

"Japanese Application Serial No. 2023-507669, Notification of Reasons for Rejection mailed Jul. 22, 2025", with English translation, 8 pages.

"Japanese Application Serial No. 2023-507669, Response filed Nov. 11, 2025 to Notification of Reasons for Rejection mailed Jul. 22, 2025", W English Claims, 14 pgs.

\* cited by examiner

INTEGRATED ENERGY ABSORBING CASTINGS

CROSS-REFERENCE TO RELATED APPLICATIONS

This application is filed under 35 U.S.C. § 371 as the U.S. National Phase of Application No. PCT/US2021/044780 entitled "INTEGRATED ENERGY ABSORBING CASTINGS" and filed Aug. 5, 2021, and which claims priority to U.S. Provisional Patent Application No. 63/062,728, filed Aug. 7, 2020, each of which is incorporated by reference in its entirety.

TECHNICAL FIELD

The disclosed subject matter generally relates to systems and methods for creating integrated energy absorbing castings for use in a vehicle. More specifically, the subject matter relates to vehicle body components which are cast as a unitary single piece and provide energy absorbing crash protection from vehicular impacts.

BACKGROUND

Traditional collision impact energy absorbing systems for vehicles include a plurality of multi-piece components. For instance, a collision impact energy absorbing system may have multiple connected pieces in the front and rear end of the vehicle that are structured into multiple stages designed to compress or crush in response to an impact force. These multiple stages may include metal stampings or extrusion components which crumple in response to an impact force.

Traditional collision impact energy absorbing systems mounted to vehicles are unable to support the increased demand for efficient manufacturing and scalability of design due to their multiple pieces and staged traditional design. Moreover, as the number of components that make up the impact energy absorbing system increase, the complexity and costs associated with manufacturing, installing and servicing these traditional impact energy absorbing systems becomes excessive.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

One embodiment is an integrated energy absorbing system for a vehicle formed from a unitary cast metal part. The system may include a left wheel well and a right wheel well connected by a transverse support; a first connection to a cabin frame; a second connection to a body panel or bumper; and a first crumple zone adjacent to the left wheel well and a second crumple zone adjacent to the right wheel well.

Another embodiment is a method of making an integrated energy absorbing system for a vehicle. The method may include casting a unitary metal piece comprising a left wheel well and a right wheel well connected by a transverse support and having a crumple zone adjacent to the left wheel well and the front wheel well.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

Figure 1:
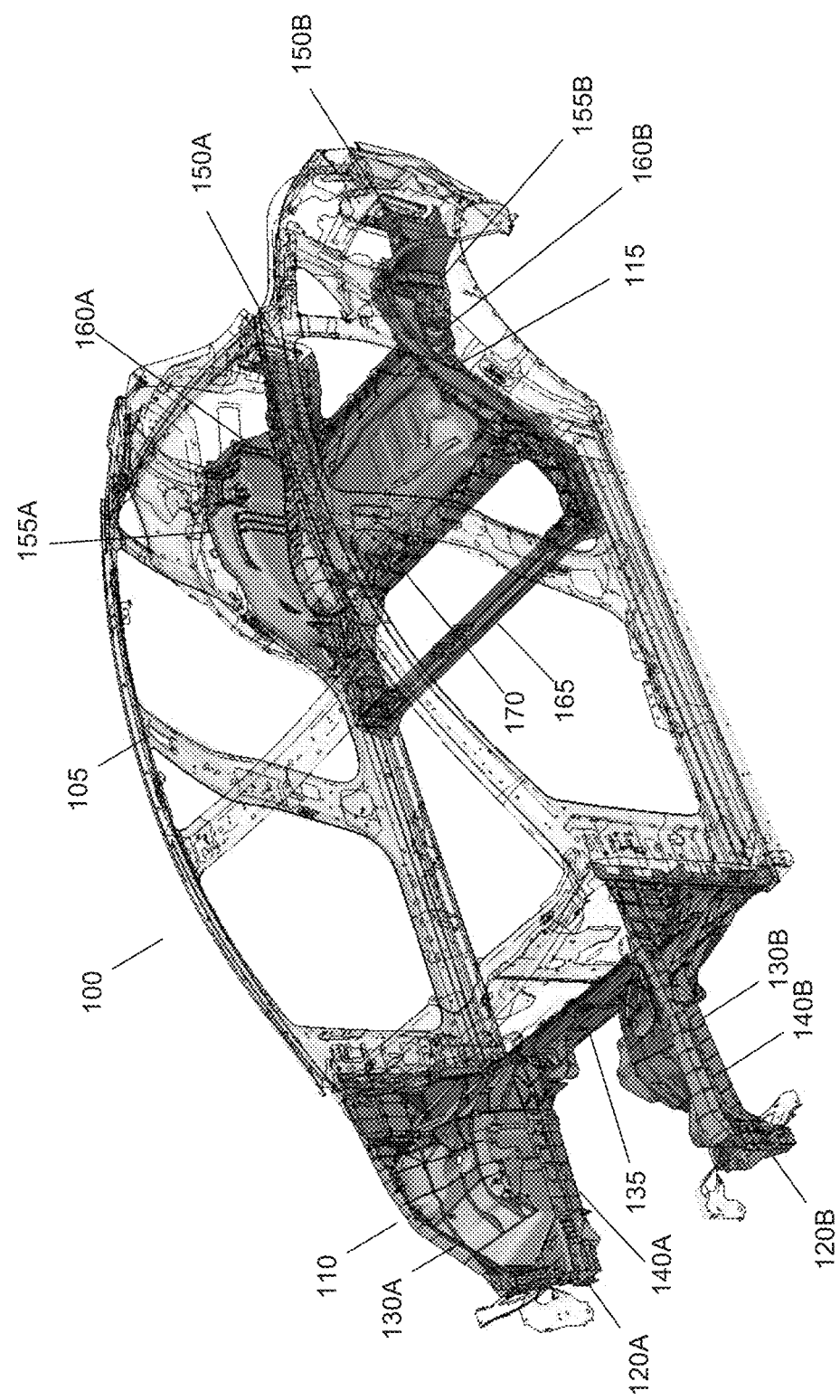
FIG. 1 is a perspective view of a front integrated energy absorbing casting and a back integrated energy absorbing casting installed into a vehicle frame, according to some embodiments of the present disclosure.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Overview

Energy absorbing systems are widely used in automotive crash structures. Examples of such systems include multi-cell extrusions and multi-piece stampings which primarily achieve energy absorption through plastic deformation of metal via dynamic crush, buckling, bending, etc.

The disclosed technology relates to cast energy absorption systems for the front and back of a vehicle that can be integrated into the frame or be part of a larger monolithic casting. Traditional energy absorbing systems are connected to the vehicle structure (e.g., backup structure) through a variety of manufacturing processes including spot-welding, seam-welding, riveting, bolting, adhesive bonding, etc. The disclosed technology enables removing the need for these processes by integrating the energy absorbing system with part or all of the backup structure through a single casting process. Hence a unified single front integrated energy absorbing casting for the front end of the vehicle and a unified single back integrated energy absorbing casting for the back end of the vehicle may make up the integrated energy absorbing casting system of the overall vehicle.

In order to prepare a cast metal part according to some embodiments, a casting die is used to cast each energy absorbing part or system. Typically, the die cavity has two surfaces, that is, a first surface and a second surface, which are pressed together to form the final casting die. The casting die contains flow paths for the molten metal alloy that are formed within the casting die to carry the molten metal alloy to each hollow section of the die to create the final cast form. During the casting procedure, a molten alloy is rapidly injected into a die cavity which then cools to produce a cast solid metal product from the molten alloy metal. In some embodiments, the process uses high pressure die casting (HPDC) wherein the molten alloy metal is fed into the sealed die under pressure.

The term "metal" as used herein is meant to include any metal or metal alloy which is capable of being die cast and is useful for a vehicle body part. One of skill in the art will be able to select the metal or metal alloy based on the cast metal or cast metal alloy to be prepared. In one embodiment, the metal is a metal alloy. In a further embodiment, the metal or metal alloy contains aluminum, zinc, magnesium, copper, lead, or tin. In another embodiment, the metal or metal alloy contains aluminum. Employing the modified die casting processes as described herein, the resultant die cast metal is not negatively impacted, i.e., it retains its desired porosity ductility, strength such as an excellent strength-to-weight ratio, weight (either light or heavy as determined by the type of metal being die cast), corrosion resistance mechanical properties, such as good thermal electrical conductivity, high temperature resistance, hardness, wear resistance, durability, and dimensional stability, among others.

The casting process uses die casting equipment, i.e., die casting machines. Such machines may be purpose or custom built to manage the unitary, large scale castings such as described herein. As used herein, the term "unitary" means a single piece, and not formed by attaching separate pieces together. Thus, injecting metal into a casting die creates one unitary piece of metal, such as a vehicle front end or rear end. This contrasts with forming separate front or rear end pieces, and then attaching those several metal pieces together with screws, bolts, tacks or welds. In one embodiment the press die casting machines may have a clamping force of 55,000 to 61,000 kilonewtons (5,600 to 6,200 tf). Using this system, molten alloy weighing 70, 80, 90, 100, or more kilograms or more may be injected into the casting die with a velocity of approximately 6 meters per second, although rates of 5-10 meters per second are within embodiments of the invention. Each cycle time may take between 60 to 120 seconds to complete, resulting in an output rate of between 30-60 completed castings per hour.

Simplistically, die casting is performed using die casting equipment, i.e., a die and hydraulic equipment. The hydraulic equipment utilized in metal die casting serves a variety of purposes and can readily be selected by one skilled in the art. In one embodiment, the hydraulic equipment is utilized for injecting and ejecting purposes and is operated using a water-insoluble hydraulic fluid.

In general, prior to casting, a water-soluble die release agent is applied to the die using techniques known in the art. In one embodiment, the release agent is sprayed onto the die. The molten metal is then injected into the die and the molten metal is injected into the die using the aforesaid mentioned hydraulic equipment. Following injection, the molten metal is cast, typically taking seconds or as required by the metal being cast. Following the casting period, the cast metal is ejected and collected using techniques known in the art. In one embodiment, the cast metal is ejected using hydraulic or robotic equipment.

Unlike extrusions and stampings, the disclosed cast energy absorbing castings achieve energy absorption by generating progressive deformation and fractures in the casting that first initiate outboard and then propagate in an inboard direction during a crash event. The progressive crush ensures robust and repeatable crash performance. The disclosed technology also encompasses and/or employs various geometrical designs and techniques to achieve the progressive and repeatable deformation and fracture behavior in the cast parts.

In general, cast alloys (e.g., alloys used in the disclosed technology) tend to have lower ductility than wrought alloys, where wrought alloys are traditionally used in collision impact energy systems. The disclosed technology implements geometric features that limit fracture propagation and encourage progressive deformation during energy absorbing load-cases. The design of the disclosed technology is most effective in absorbing energy in alloys with large amounts of ductility, but is specifically more flexible to be made from cast materials that have limited ductility. The geometry of the casting is tuned specifically to the level of ductility and strength of the material used for a given design (e.g., the designs of the disclosed technology as described herein) to achieve the desired rates of energy absorption.

Any alloys and manufacturing processes that exhibit noticeable deformation before fracture (e.g., ductile fracture) may be suitable for use in the disclosed technology.

Hence, the disclosed technology may use structural (e.g., high vacuum) high pressure die cast aluminum, and/or magnesium alloys.

Some examples of suitable alloys of the disclosed technology may include: Aluminum with a Mg and/or Si based systems with low Fe contents such as AlSi7, AlSi10Mn, AlSi10Mg, AlSi7Mg, AlSi9MgMnSr, AlMg5Si2Mn; Aluminum with High Fe and Low Si alloys such as AlMg4Fe2; and Magnesium HPDC such as AZ91D or AE44.

More specifically, cast aluminum alloys of the disclosed technology may contain between 6 and 12% Si and have a composition tuned to specifically limit microstructural features that promote brittle fracture modes. The composition may have minimized AlFeSi inter-metallics with a sharp aspect ratios, rounded (modified) Silicon eutectic phases, and/or other elements added for strengthening of the alloy materials.

The cast alloy (e.g., the alloys described herein) and manufacturing process thereof, may be used individually, in part, or in combination with an overall integrated energy absorbing system of a vehicle. In one embodiment, the vehicle frame is made from only three principal components, a front unitary cast energy absorbing piece, a rear unitary cast energy absorbing piece and a central cab frame which mounts to the front and rear pieces.

At least the following three design foundations may be used individually, in part, or in combination with each other to create a cast energy absorbing structure. One design foundation is u the use of a ribbed "C" section casting wherein certain impact absorbing sections includes "C" shaped ribs which provide support for the part, but allow for a predetermined fracture profile depending on the size and number of "C" sections placed within each casting. In another design, each cast part uses an "I" shaped central rib within the cast part to provide structural support and also the desired fracture profile during an impact event. The third design may be a closed section casting design, where each section has a closed portion which may taper or include different numbers of internal structures to provide a desired structural support, while also providing a desired fracture profile during an impact event. These and other implementations are discussed more fully below with reference to the attached figures.

Exemplary Integrated Energy Absorbing Casting System

FIG. 1 is a perspective view of a vehicle 100 having a central cab frame 105, a front integrated energy absorbing casting 110 and back integrated energy absorbing casting 115. The front casting 110 includes a right side 120A and left side 120B which form the front side right and left bumper mounts for mounting a front bumper or forward-facing grill panel to the vehicle. The right side 120A also includes a wheel well 130A which surrounds the front, right wheel of the vehicle 100. The left side 120B includes a left wheel well 130B which surrounds the front, left wheel of the vehicle 100. A transverse support 135 connects the right side 120A to the left side 120B to form the front integrated energy absorbing casting 110.

The right side 120A has a plurality of cast crumple zones 140A formed by a series of repeated cells to create a multicell structure formed into the casting 100. The plurality of cast crumple zones 140A may located adjacent to the right wheel well 130A. Each cell may be formatted as square, rectangle or other geometrically shaped form defined by a center and edges and that come together in a plurality of adjacent cells to form a multicell structure. As will be shown in more detail with reference to FIGS. 2 and 3, the crumple zones are designed to crumple or crush when hit with a significant force during an impact and absorb some of the impact energy. The left side 120B has a plurality of cast crumple zones 140B which are also designed to crush or crumple if struck by an impact to the front of the vehicle 100. The cast crumple zones 140B may be located adjacent to the left wheel well 130B.

It should be realized that the casting 110 is formed by casting a single piece of metal alloy into the one unitary structure. This contrasts with prior automotive crumple zones which are made up of a variety of pieces, all mounted together to form the vehicle frame. The cast form allows for a much easier and more flexible process of manufacturing the vehicle due to the lower parts cost, and also the ability to create more complex geometries for the crumple zones as each portion or section of the casting 110 can be designed to have the maximum performance without reliance on needing to include additional mounting brackets, bolts, welds and other features which may have differing performance as they are individually installed into a vehicle.

FIG. 1 also shows details of the back integrated energy absorbing casting 115 which includes a right side 150A and left side 150B at the rearmost portion of the vehicle. The right side 150A and left side 150B may include attachments for mounting a rear bumper or other rear body panel which covers the rearmost portion of the vehicle 100. The right side 150A of the casting 115 also includes a right wheel well 155A and right rear crumple zone 160A that is adjacent to the right wheel well. The left side 150B of the casting 115 includes a left wheel well 155B and a left rear crumple zone 160B that is adjacent to the left wheel well. A transverse support strut 165 and a rear undercarriage 170 connect the right side 150A and left side 150B together to form the unitary cast back integrated energy absorbing casting 115. The transverse support strut 165 can be used as a mount, or include components or features, which allow the back integrated energy absorbing casting 115 to be mounted to the rear portion of a vehicle cabin frame. Other portions of the back integrated energy absorbing casting 115 may also include mounts for connecting the back integrated energy absorbing casting 115 to a vehicle cabin frame.

Figure 2:
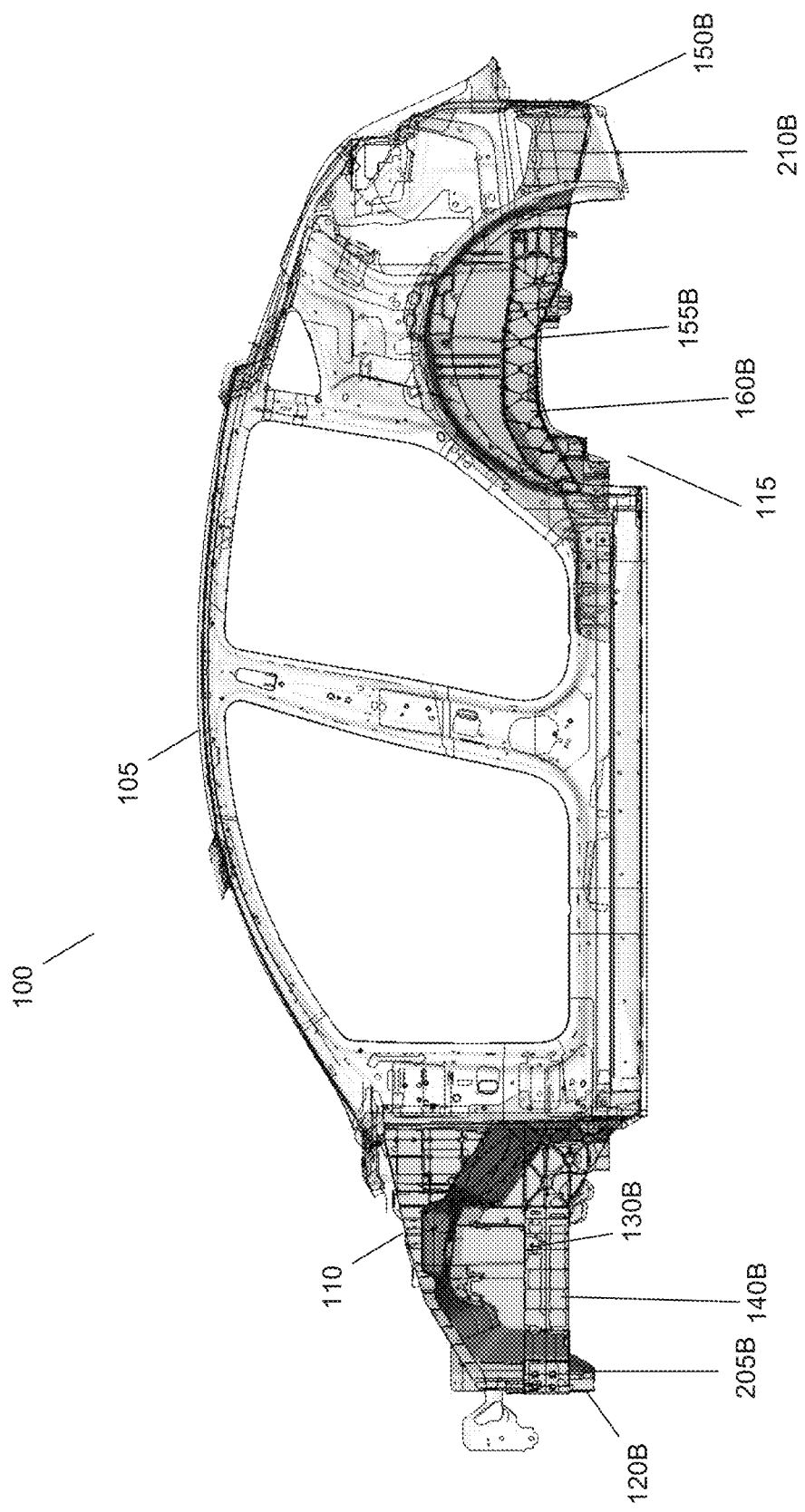
FIG. 2 is a side view of the front integrated energy absorbing casting and the back integrated energy absorbing casting installed in vehicle frame, according to some embodiments of the present disclosure.

FIG. 2 shows a side perspective view of the front integrated energy absorbing casting 110 and back integrated energy absorbing casting 115. The cast crumple zone 140B in the front casting 110 is shown as part of the lower region of the wheel well 130B. The crumple zone 140B includes a multicell structure made up of a plurality of individual cells formed as part of the cast metal and configured to absorb a front impact and fracture to absorb the energy of such an impact. A forward crumple zone 205B also includes a multicell structure and is configured to also absorb an impact and mount to a front bumper or body panel of the vehicle. This will be shown in more detail with reference to FIG. 3.

FIG. 2 also shows a side view of the back integrated energy absorbing casting 115 and cast left rear crumple zone 160B which includes a multicell structure. Rearward from the left rear crumple zone 160B is a left rear end crumple zone 210B which is configured to mate with a rear bumper or body panel. This will be shown in more detail with reference to FIG. 4.

Figure 3:
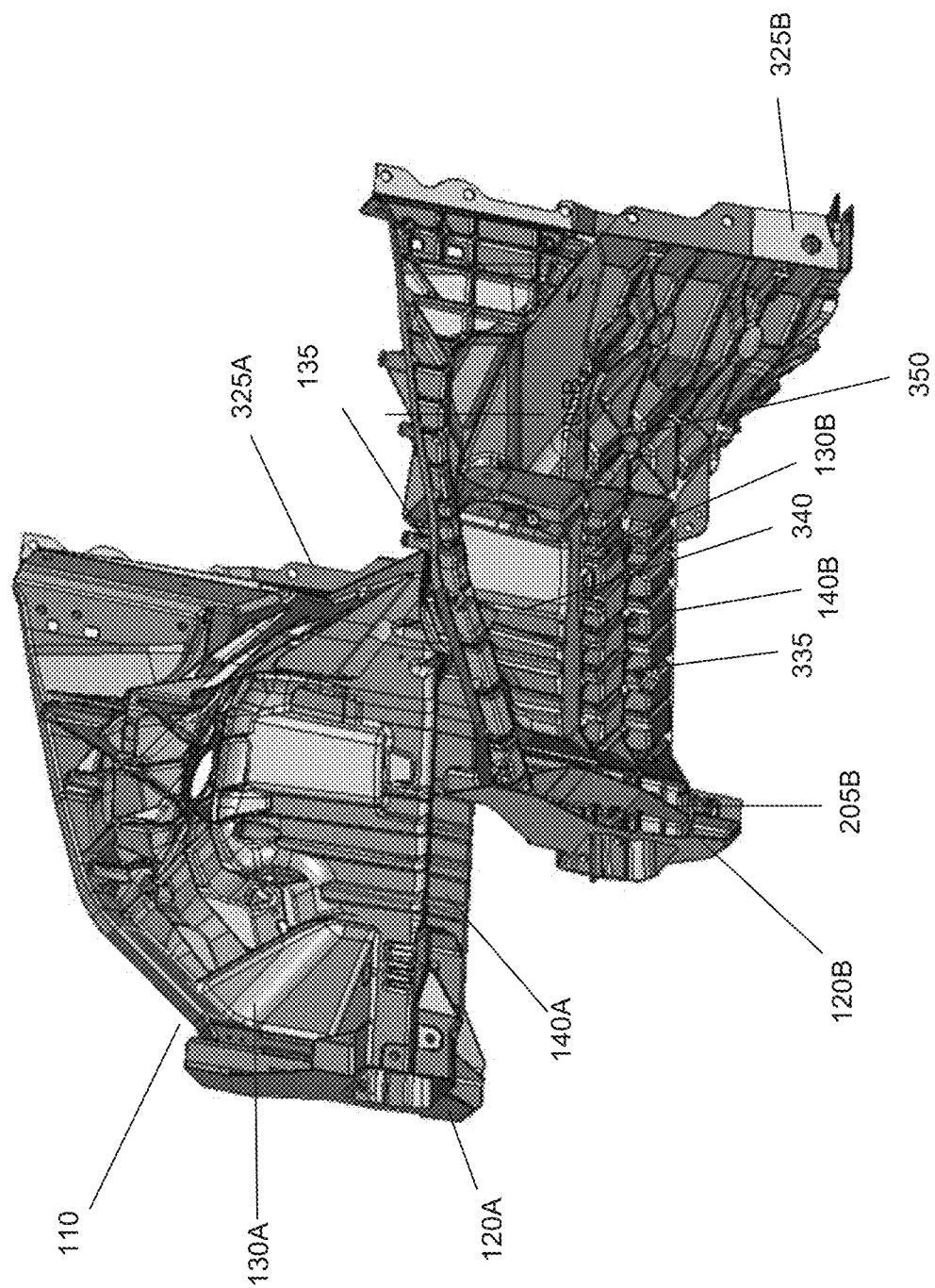
FIG. 3 is a perspective view of the front integrated energy absorbing casting, according to some embodiments of the present disclosure.

Referring now to FIG. 3, a perspective close-up view of the front integrated energy absorbing casting 110 is shown. The front casting 110 includes the right side 120A and left side 120B which form the front side right and left bumper mounts for mounting a front bumper or forward-facing grill panel to the vehicle. The right side 120A also includes the wheel well 130A which surrounds the front, right wheel of the vehicle 100. The left side 120B includes the left wheel well 130B which surrounds the front, left wheel of the vehicle 100. The transverse support 135 connects the right side 120A to the left side 120B to form the front integrated energy absorbing casting 110. The left side 120B includes a rear frame mount 325B and the right side 120A includes a rear frame mount 325A. The rear frame mounts 325A/B are used to mount the front integrated energy absorbing casting 110 to a vehicle cabin frame.

As shown in more detail in FIG. 3, the crumple zone 140B includes a lower crumple region 335B, a center crumple region 338B and an upper crumple region 340. Each of these regions is designed with a set of vertical supports which allow rearward crush of the entire crumple zone 140B when struck by a front impact. In addition, between the crumple zone 140B and frame mount 325B is an additional multicell region 350 which is configured to crumble or fracture following a front impact, but to impart more impact force to protect the occupants of the vehicle. The ability to cast the front integrated energy absorbing casting 110 as a single piece allows it to be designed with specific multicell design and other support features which allow the casting to be designed with specific crumple zones providing varying levels of impact resistance. Thus, the most forward zones may crumple the easiest following an impact, whereas the zones which are more near the cabin may be designed with additional supports to prevent the impact from breaching into the cabin area of the vehicle.

Figure 4:
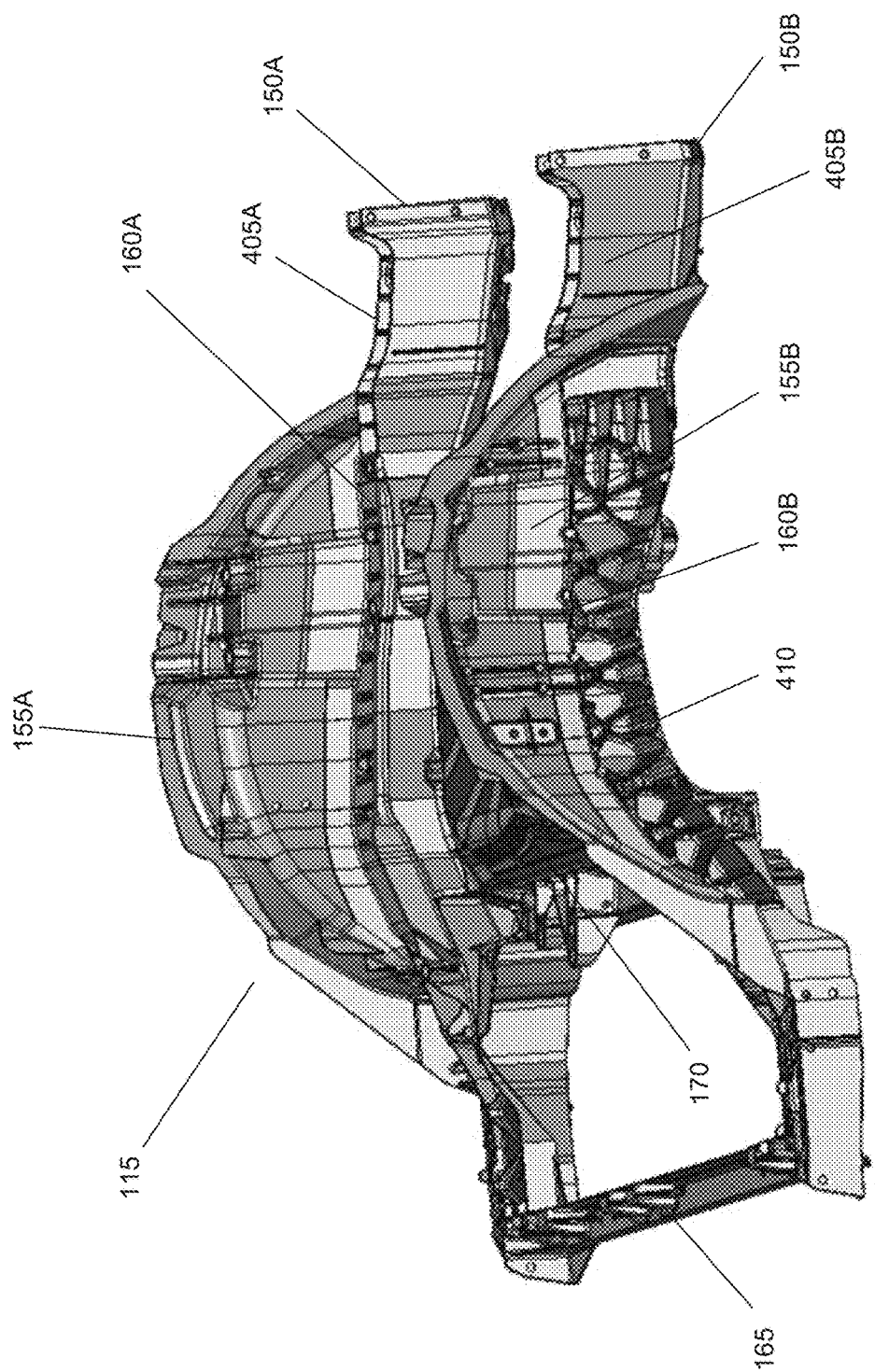
FIG. 4 is a perspective view of the back integrated energy absorbing casting, according to some embodiments of the present disclosure.

FIG. 4 is a side perspective view of the back integrated energy absorbing casting 115 which includes a right side 150A and left side 150B at the rearmost portion of the vehicle. The right side 150A and left side 150B may include attachments for mounting a rear bumper or other rear body panel which covers the rearmost portion of the vehicle 100. The right side 150A of the casting 115 also includes a right wheel well 155A and right rear crumple zone 160A. The left side 150B of the casting 115 includes a left wheel well 155B and a left rear crumple zone 160B. A transverse support strut 165 and a rear undercarriage 170 connect the right side 150A and left side 150B together to form the unitary cast back integrated energy absorbing casting 115.

The right side 150A connects to the casting 115 through a right crumple region 405A that is configured to fracture and crumple when impacted from the rear. The crumple region 405A may be hollow with internal vertical supports or a multicell structure which gives the region stability, but allows it to absorb the energy from a rear impact. Similarly, the left side 150B connects to the casting 115 through a left ribbed region 405B that is configured to fracture and crumple when impacted from the rear. The left ribbed region 405B may be hollow with internal vertical supports or a multicell structure which gives the region stability, but allows it to absorb the energy from a rear impact.

The left rear crumple zone 160B shows a "X" shaped support structure 410 which is used to support to left wheel well and allow a rear impact force to be absorbed as the impact moves towards the rear cabin section. Of course, the specific shapes of the support structures can be modified to different compressible or fracturable configurations without departing from the spirit of the present disclosure.

Figure 5:
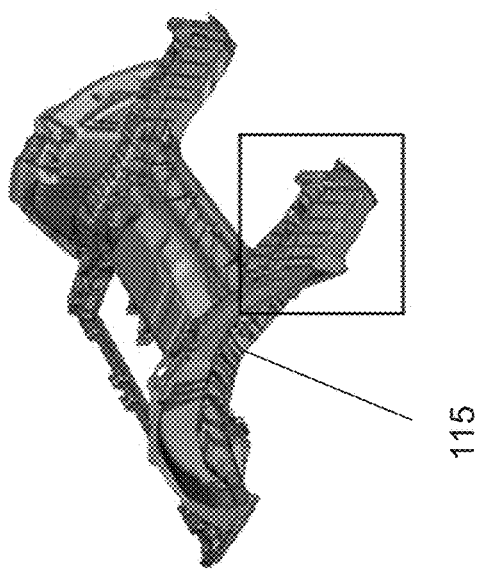
FIG. 5 is an example top perspective view of the ribbed section of the back integrated energy absorbing casting, displaying a cutout, waveform profile, tapering, flaring, and spacing, according to some embodiments of the present disclosure.
Figure 5:
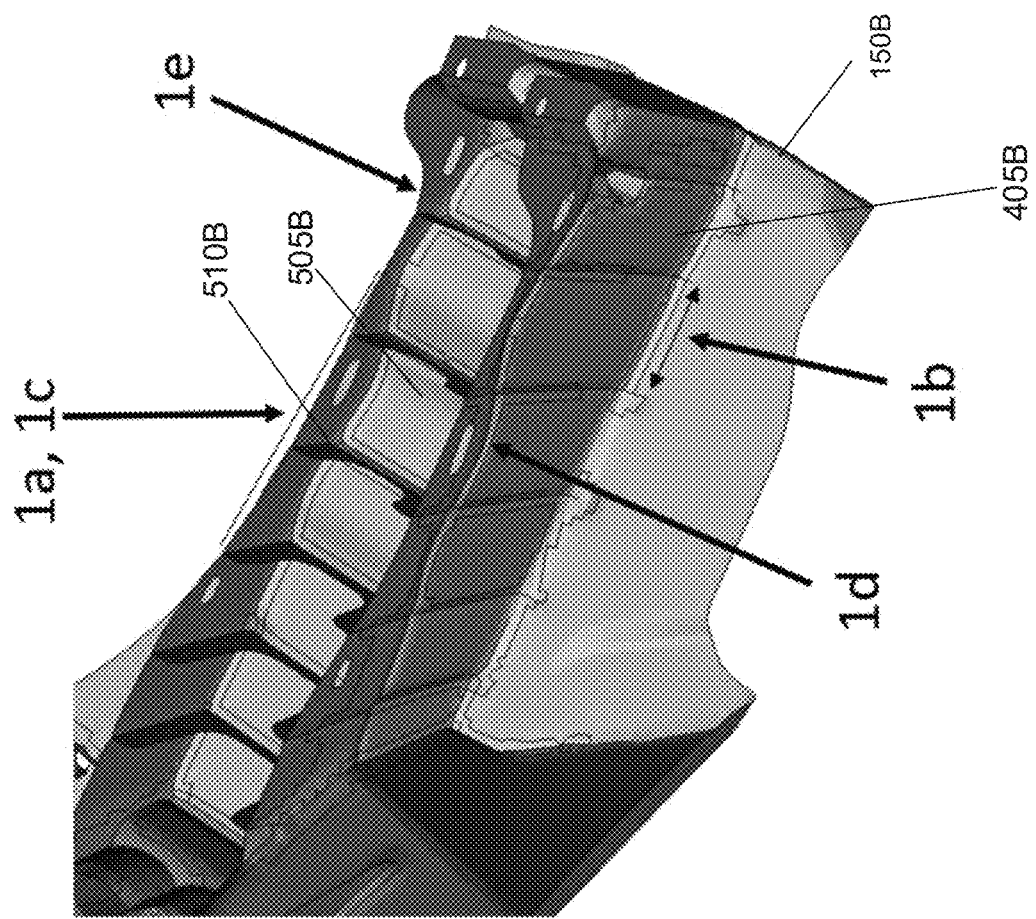
Figure 6:
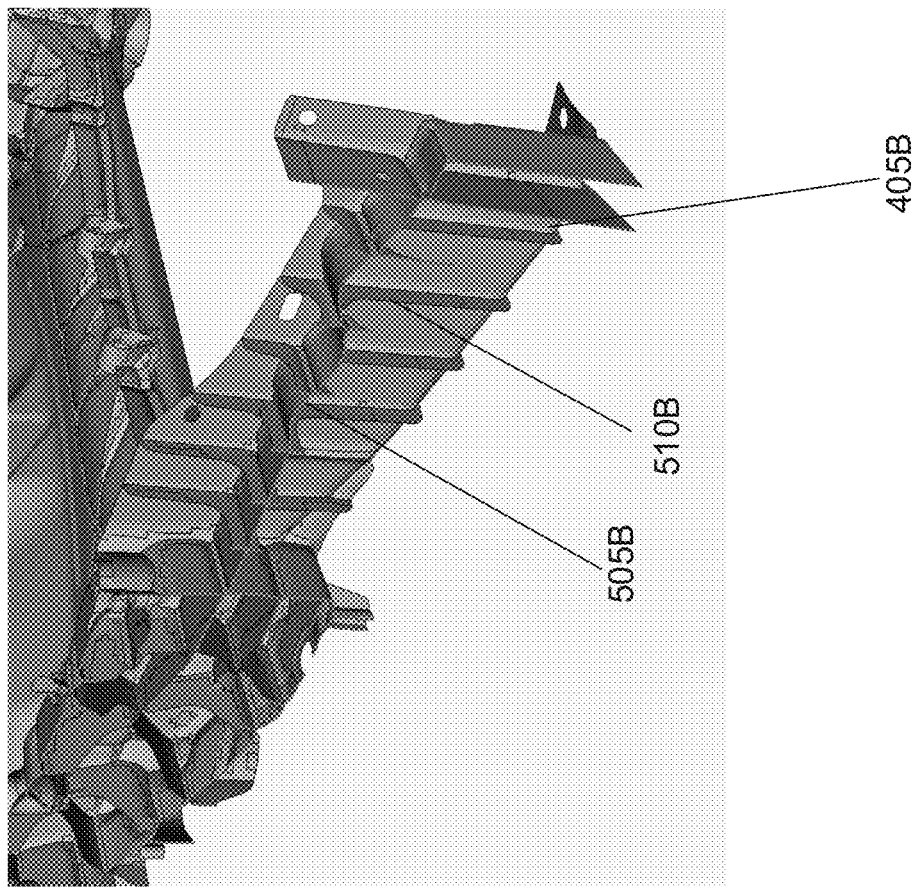
FIG. 6 is a perspective view of a partial cut-away view showing one embodiment of an internal structure of the ribbed section of the rear portion of the back integrated energy absorbing casting.

FIG. 5 shows an expanded view of the left side 150B and the left ribbed region 405B. FIG. 6 is an example cross section view of the ribbed section 405B further displaying a wave platform of the back integrated energy absorbing casting. As shown, the ribbed region 405B displays a set of ribs 510B which includes a wave feature 505B disposed between each rib. Also shown are a cutout 1e, waveform profile 1d, tapering 1a, 1c, flaring 1a, 1c, and spacing 1b between each rib 510B.

Figure 7:
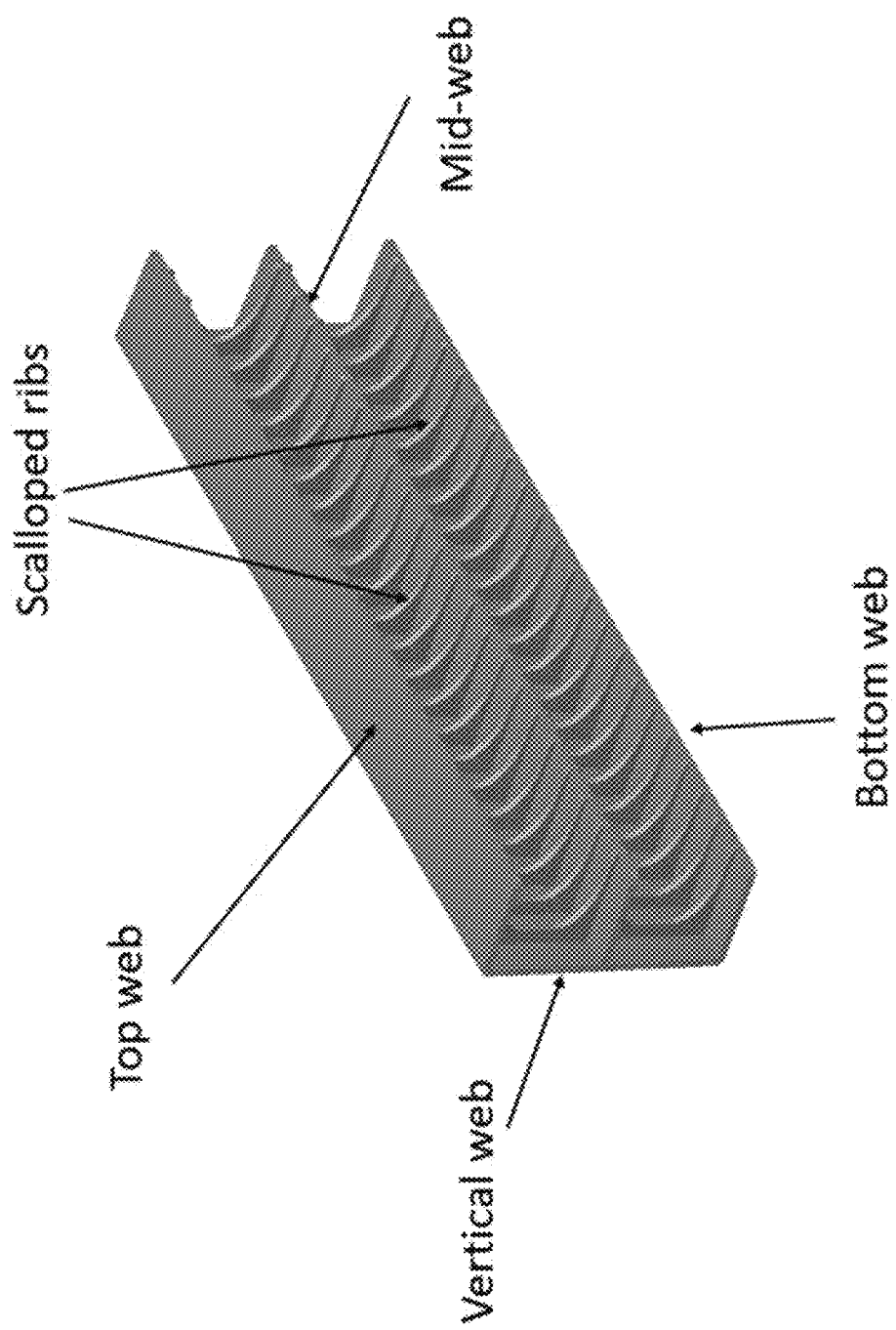
FIG. 7 is an example ribbed "C" section casting, according to some embodiments of the present disclosure.

FIG. 7 is a side view of the front integrated energy absorbing casting, displaying a ribbed "C" section that can be used as a configuration of ribs within embodiments of the present disclosure. As shown the ribbed "C" section casting consists of a top web, a vertical web and a bottom web that forms a "C" section. Additionally, there is a mid-web or support which can increase energy absorption and scalloped ribs to promote progressive crush. The scallop feature may also add mass efficiency to each rib within the casting. The illustrated "C" section of FIG. 7 has a casting design with its primary draw direction orthogonal to the crush axis. However, the "C" section design may be used when the primary draw direction for the casting is parallel or near parallel to the vertical web, and the ribs and mid-web features are cast by slides.

Techniques discussed for the ribbed "I" section casting and back integrated energy absorbing casting may also be used individually, in part, or in combination with the "C" section design of the front integrated energy absorbing casting.

Figure 8:
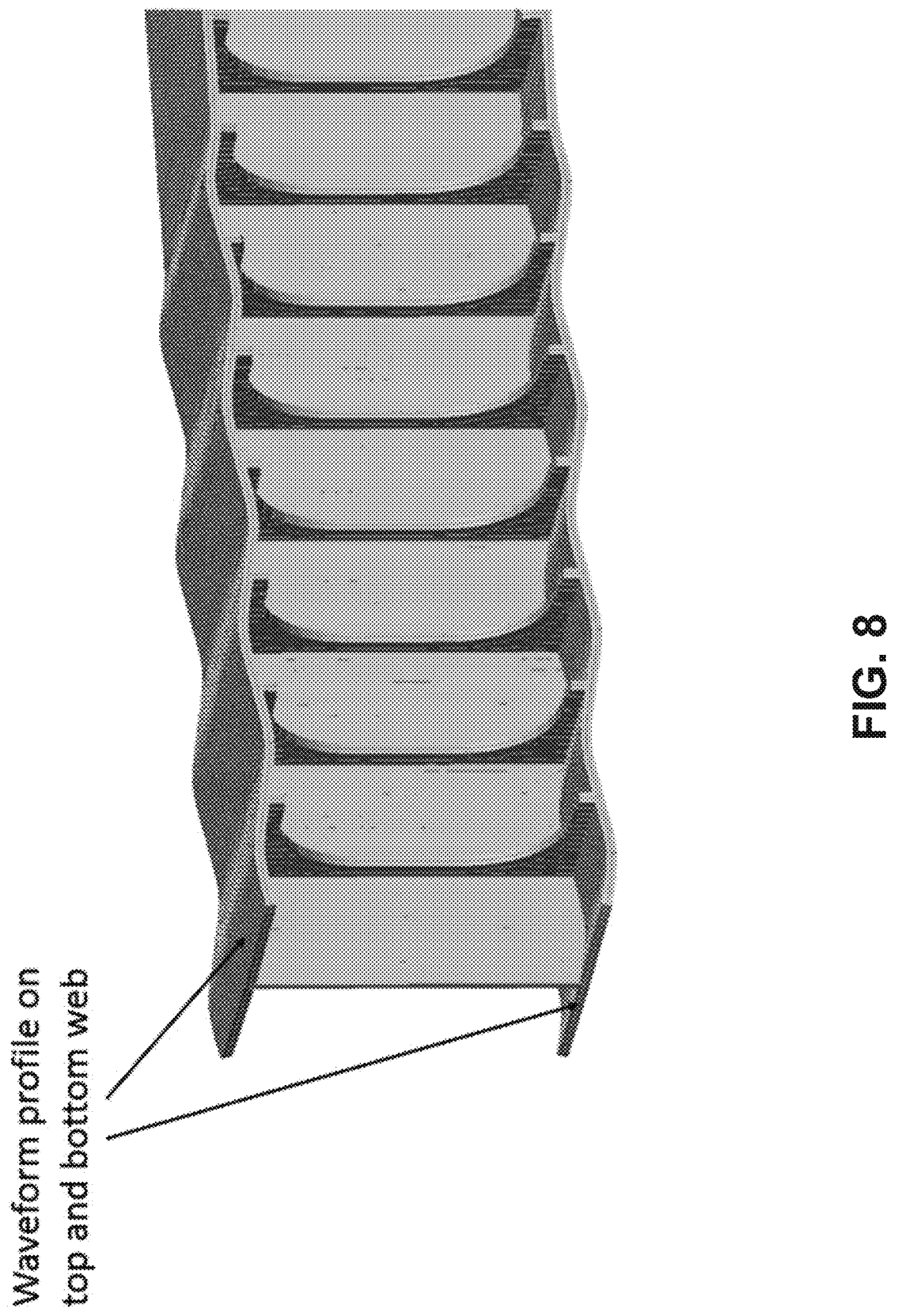
FIG. 8 is an example cross section view of the ribbed section further displaying an alternate embodiment wave design of the back integrated energy absorbing casting, according to some embodiments of the present disclosure.

FIG. 8 is an example cross section view of a ribbed section casting further displaying a wave platform of the back integrated energy absorbing casting. The wave profile may be provided on the top and bottom sections, or just the top, or just the bottom sections to provide a desired energy absorbing profile for the section. In addition, the number and size of C sections disposed within the casting may be varied to increase or decrease the crush strength of the casting section.

Figure 9:
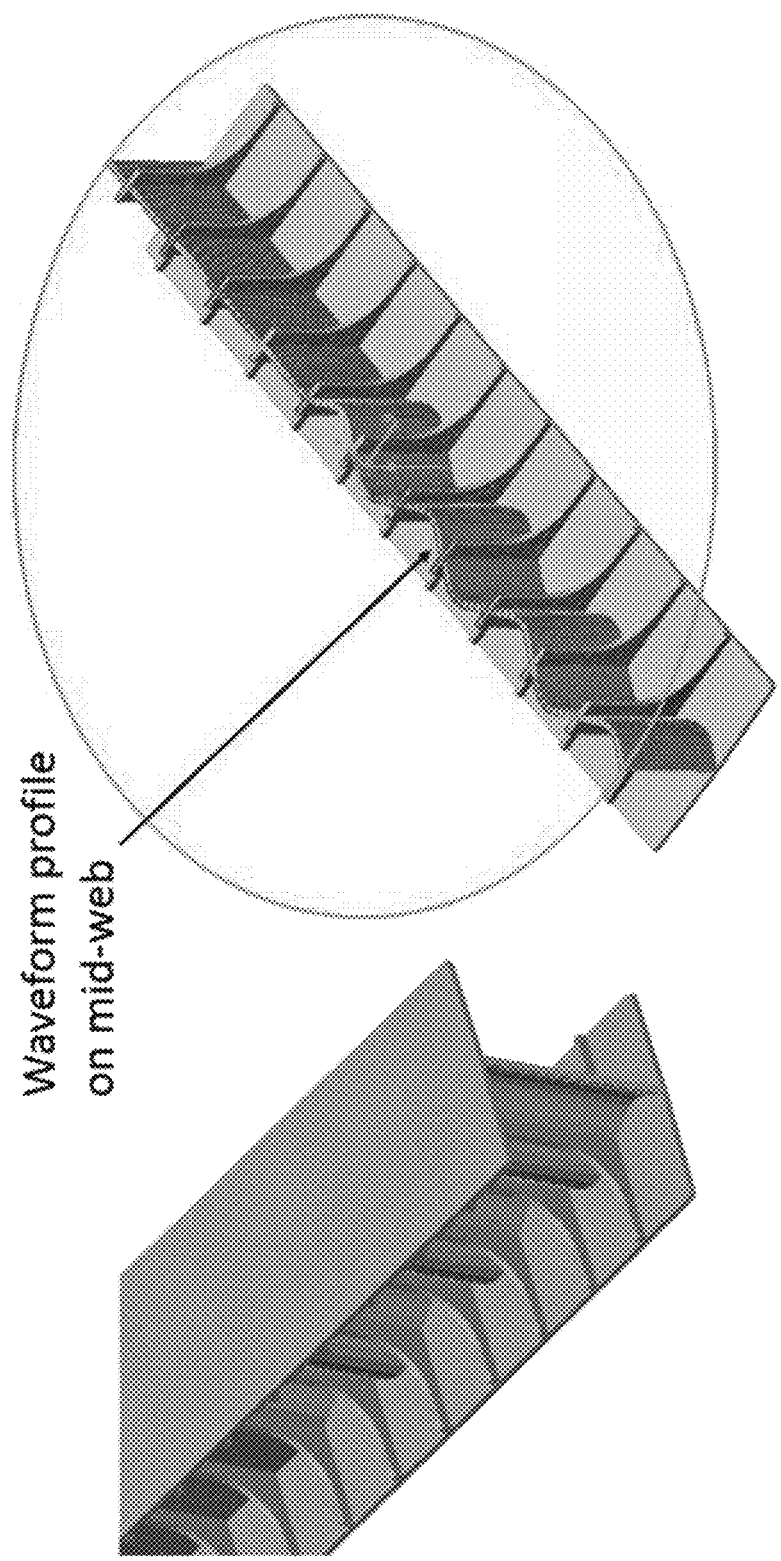
FIG. 9 is an example waveform profile between ribs of ribbed section castings, according to some embodiments of the present disclosure.

FIG. 9 is an example waveform profile disposed between ribs of ribbed section castings. A waveform profile can be added to the mid-web and/or the top and bottoms webs in order to initiate fracturing between ribs in some embodiments.

Figure 10:
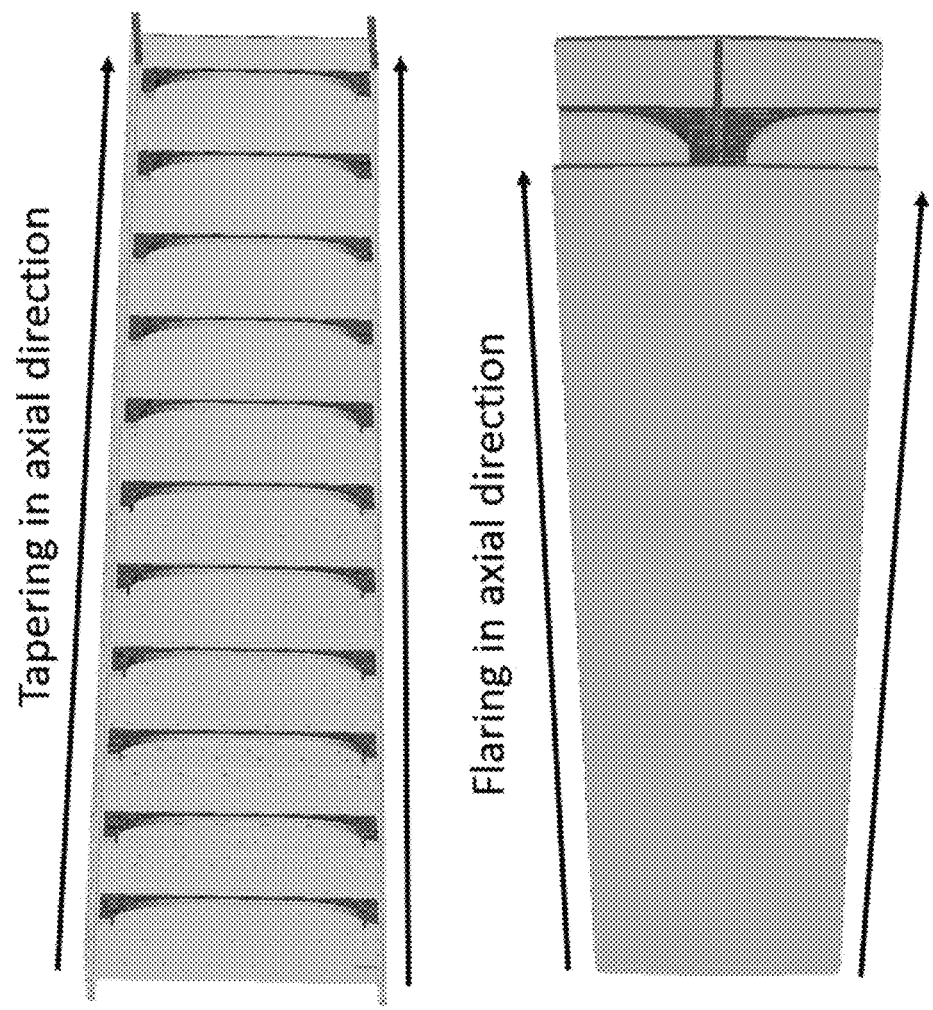
FIG. 10 is an example of tapering or flaring of ribbed section castings, according to some alternate embodiments of the present disclosure.

FIG. 10 is an example of tapering or flaring of ribbed section castings. The mid-web or upper and lower webs may be tapered to promote progressive crush. The tapering or flaring technique may be used to compensate for unfavorable offsets and tapers, the design may otherwise have, due to packaging and process constraints.

Figure 11:
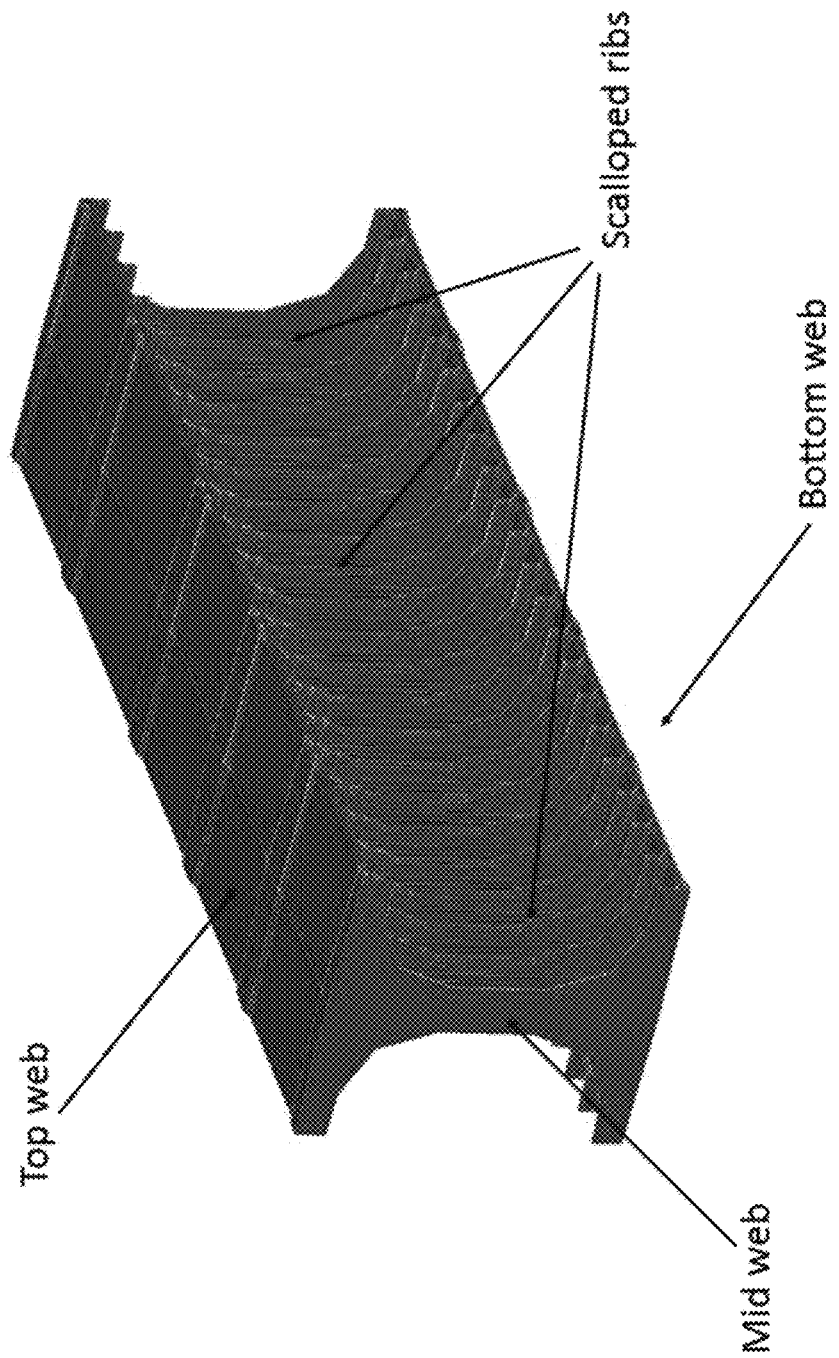
FIG. 11 is an example ribbed "I" section casting, according to some alternate embodiments of the present disclosure.
Figure 12:
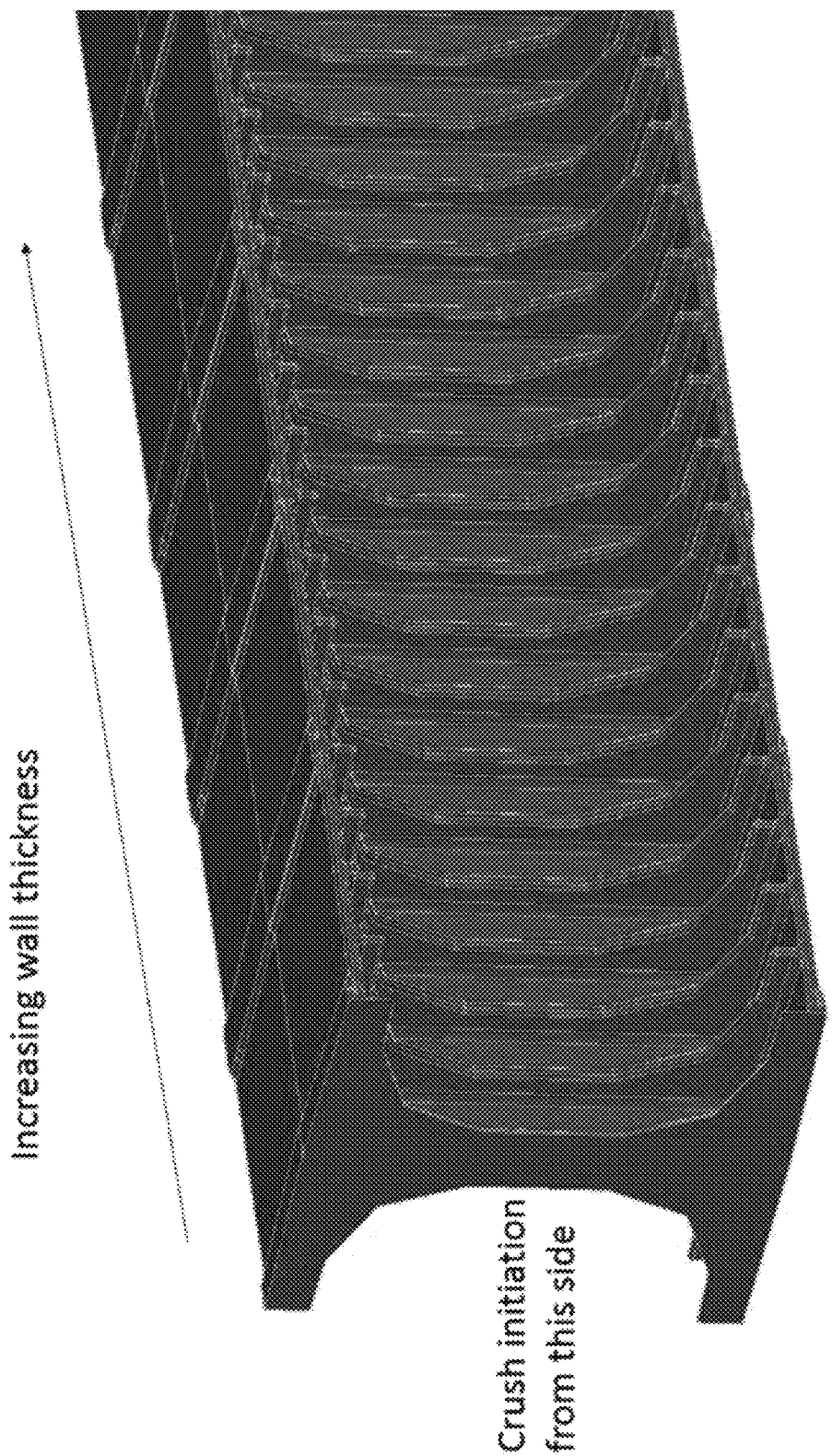
FIG. 12 is the example ribbed "I" section casting, displaying progressive wall thickness, according to some embodiments of the present disclosure.
Figure 13:
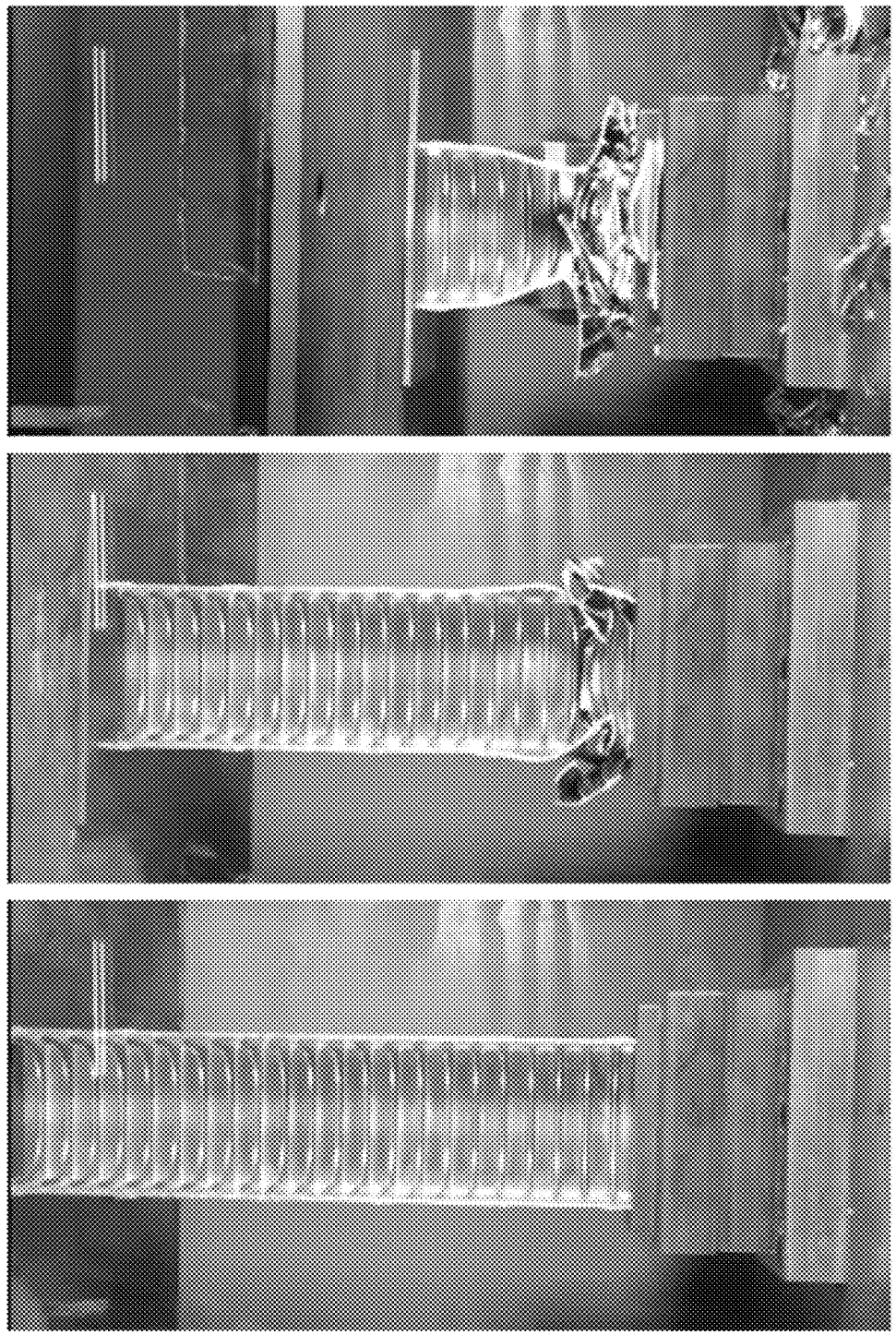
FIG. 13 is an example progressive crush of the ribbed "I" section casting, according to some embodiments of the present disclosure.

FIG. 11 of the present disclosure show embodiments of a ribbed "I" section casting. As shown there is a top web, a bottom web and a mid web, which form a set of scallop ribs in an "I" shape through the casting. FIG. 12 is the example ribbed "I" section casting, displaying progressive wall thickness where the thickness of each "I" section within the casting is greater along the lateral dimension of the casting part. FIG. 13 shows an actual example of a test progressive crush of a ribbed "I" section casting showing that the casting fractures as anticipated along the lateral length of the part. A key feature of the "I" section design is the spaced ribs that maximize the amount of fracturing which in turn increase energy absorption. A scallop feature is added to each rib for mass efficiency. The ribs provide local reinforcements that limit the deformation and fracture from propagating in orientations that would destabilize the crushing. FIG. 13 shows the progressive fracturing behavior of the "I" section design.

In addition, the following supplemental design techniques may be used independently, in part, or in combination to promote progressive crush and mass efficiency for any of the described structures in the exemplary integrated energy absorbing casting system as described herein. These techniques are adopted to cater to specific crash performance requirements and casting process constraints. The techniques include: 1. Progressively increasing wall thickness, 2. Rib spacing, 3. Tapering or flaring profile in axial direction, 4. Waveform profile between webs, and 5. Cut out between ribs in top web and bottom web.

In addition, the casting wall thicknesses may be increased progressively in the direction of crush. The increasing progressive wall thickness can independently, in part, or in combination be applied to the mid-web, top and bottom webs, and/or ribs. Also, the rib spacing may be varied, to ensure fracturing occurs between ribs, and to minimize fracture propagation perpendicular to the ribs. The preferable rib spacing is influenced by various factors including web thickness and process constraints.

Figure 14:
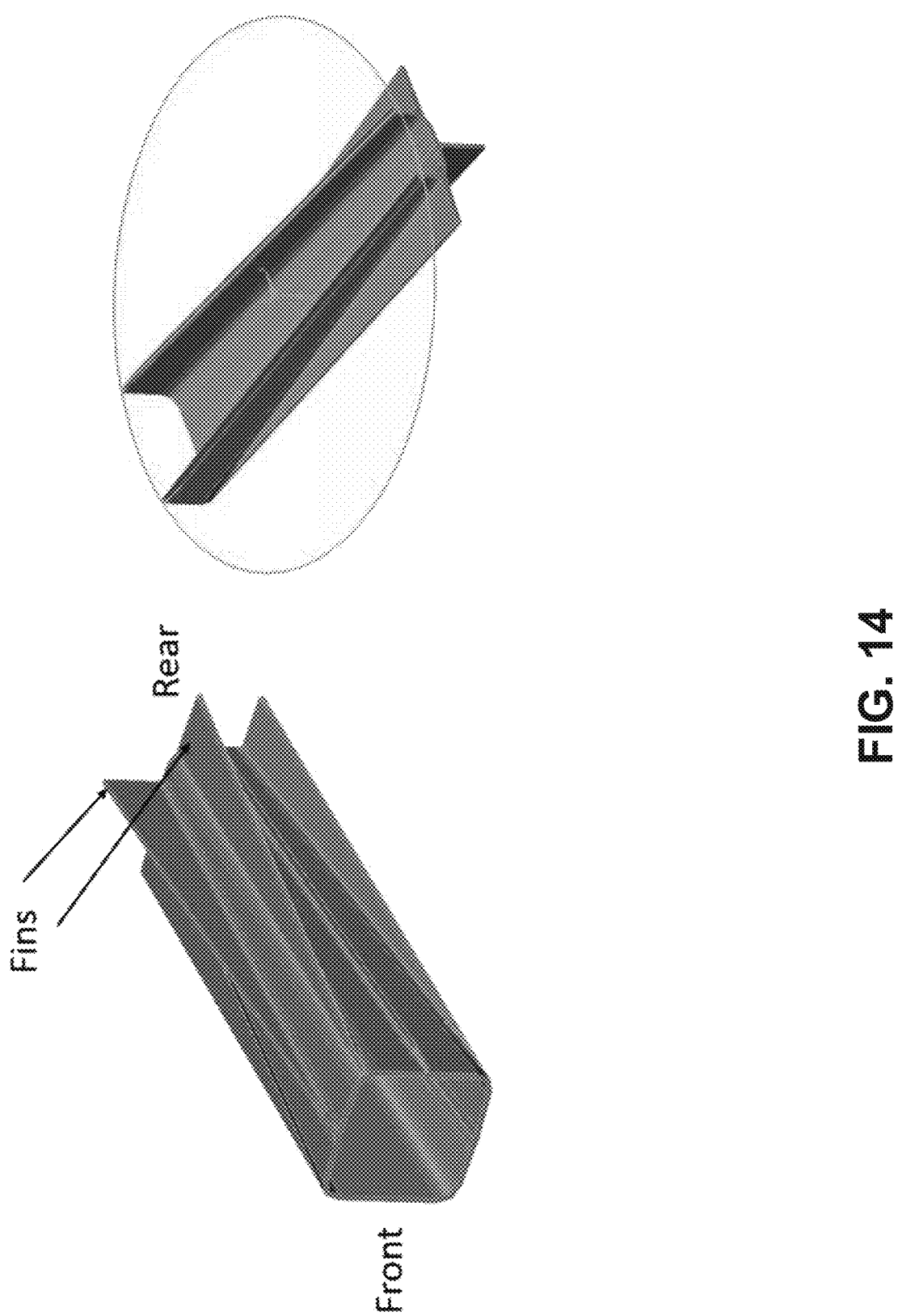
FIG. 14 is an example closed section casting, according to some embodiments of the present disclosure.
Figure 15:
FIG. 15 is an example progressive crush of the closed section casting, according to some embodiments of the present disclosure.

FIG. 14 show embodiments of a closed section casting and FIG. 15 is an example progressive crush of a closed section casting. A closed section casting design as shown in FIG. 14 may comprise a square or rectangular section that is tapered to accommodate a draft angle required by the casting process. Fins may be alternatively added to the design to make up for the reduction of section due to the taper. The open square section lends itself to axial crush, and the fins promote stability and energy absorption.

The rear of the closed section casting is integrated with a larger casting. The square or rectangular section may be created using a slide parallel or near parallel to the crush direction.

EXAMPLE IMPLEMENTATIONS

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

The systems, methods, and devices described herein each have several aspects, no single one of which is solely responsible for its desirable attributes. Without limiting the scope of this disclosure, several non-limiting features will now be discussed briefly. The following paragraphs describe various example implementations of the devices, systems, and methods described herein.

Example One: An integrated energy absorbing system of a vehicle comprising a front integrated energy absorbing casting and a back integrated energy absorbing casting.

Example Two: The integrated energy absorbing system of Example One, wherein the front integrated energy absorbing casting is located in the front of the vehicle.

Example Three: The integrated energy absorbing system of Example One, wherein the front integrated energy absorbing casting is located in the back of the vehicle.

Example Four: The integrated energy absorbing system of Example One, wherein the front integrated energy absorbing casting comprises a ribbed "C" section.

Example Five: The integrated energy absorbing system of Example Four, wherein the ribbed "C" section comprises a top web, bottom web, and vertical web that forms the "C" section.

Example Six: The integrated energy absorbing system of Example Four, wherein the ribbed "C" section further comprises a mid-web to increase energy absorption.

Example Seven: The integrated energy absorbing system of Example Four, wherein the ribbed "C" section further comprises a plurality of scalloped ribs to promote progressive crush.

Example Eight: The integrated energy absorbing system of Example Seven, wherein the scallop of the scalloped ribs add mass efficiency to each rib.

Example Nine: The integrated energy absorbing system of Example One, wherein the back integrated energy absorbing casting comprises a ribbed section.

Example Ten: The integrated energy absorbing system of Example Nine, wherein the ribbed section is either a ribbed "I" section or a ribbed "C" section.

Example Eleven: The integrated energy absorbing system of Example Nine, wherein the ribbed section of the back integrated energy absorbing casting comprises a wave platform.

Example Twelve: The integrated energy absorbing system of Example Nine, wherein the ribbed section of the back integrated energy absorbing casting comprises a cutout to promote progressive crush.

Example Thirteen: The integrated energy absorbing system of Example Nine, wherein the ribbed section of the back integrated energy absorbing casting comprises a waveform profile.

Example Fourteen: The integrated energy absorbing system of Example Thirteen, wherein the waveform profile is on a top and bottom web of the ribbed section.

Example Fifteen: The integrated energy absorbing system of Example Thirteen, wherein the waveform profile is between ribs of the ribbed section.

Example Sixteen: The integrated energy absorbing system of Example Thirteen, wherein the waveform profile is on a mid-web of the ribbed section.

Example Seventeen: The integrated energy absorbing system of Example Thirteen, wherein the ribbed section of the back integrated energy absorbing casting comprises tapering.

Example Eighteen: The integrated energy absorbing system of Example Thirteen, wherein the ribbed section of the back integrated energy absorbing casting comprises flaring.

Example Nineteen: The integrated energy absorbing system of Example Thirteen, wherein the ribbed section of the back integrated energy absorbing casting comprises spacing between each rib.

Example Twenty: The integrated energy absorbing system of Example One, wherein the integrated energy absorbing system further comprises closed section casting.

As noted above, implementations of the described examples provided above may include hardware and/or a method or process.

Additional Implementation Considerations

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

What is claimed is:

1. An integrated energy absorbing system for a vehicle formed from a unitary cast metal part and comprising:
   a left wheel well and a right wheel well connected by a transverse support;
   at least one mount to a vehicle cabin frame;
   a second connection to a vehicle body panel or bumper; and
   a first crumple zone adjacent to the left wheel well and a second crumple zone adjacent to the right wheel well, wherein the first crumple zone and the second crumple zone comprise a waveform profile.

2. The integrated energy absorbing system of claim 1, wherein the integrated energy absorbing system is located in a front of the vehicle.

3. The integrated energy absorbing system of claim 2, wherein the at least one mount to the vehicle cabin frame is at a rear of the unitary cast metal part.

4. The integrated energy absorbing system of claim 2, wherein the second connection is mounted to a front bumper.

5. The integrated energy absorbing system of claim 2, wherein the first and second crumple zones have a microcell structure formed from a plurality of individual cells.

6. The integrated energy absorbing system of claim 1, wherein the integrated energy absorbing system is located in a back of the vehicle.

7. The integrated energy absorbing system of claim 6, wherein the at least one mount to the vehicle cabin frame is at a front of the unitary cast metal part.

8. The integrated energy absorbing system of claim 6, wherein the second connection is mounted to a rear body panel or bumper.

9. The integrated energy absorbing system of claim 1, wherein the integrated energy absorbing system is located in at least one of a front of the vehicle and a back of the vehicle, and wherein the first and second crumple zones have a microcell structure formed from a plurality of individual cells.

10. The integrated energy absorbing system of claim 1, wherein the first crumple zone or the second crumple zone comprise a ribbed "C" shaped section.

11. The integrated energy absorbing system of claim 10, wherein the ribbed "C" shaped section comprises a top web, bottom web, and vertical web that forms the "C" shaped section.

12. The integrated energy absorbing system of claim 11, wherein the ribbed "C" shaped section further comprises a mid-web to increase energy absorption.

13. The integrated energy absorbing system of claim 10, wherein the ribbed "C" shaped section further comprises a plurality of scalloped ribs to promote progressive crush.

14. The integrated energy absorbing system of claim 1, wherein the waveform profile is on a top and bottom web of a ribbed section.

15. The integrated energy absorbing system of claim 1, wherein the waveform profile is between ribs of a ribbed section.

16. The integrated energy absorbing system of claim 1, wherein the waveform profile is on a mid-web of a ribbed section.

17. The integrated energy absorbing system of claim 1, wherein the casting comprises aluminum metal.

18. The integrated energy absorbing system of claim 17, wherein the casting comprises an aluminum and magnesium alloy or an aluminum and silicon alloy.

19. An integrated energy absorbing system for a vehicle formed from a unitary cast metal part and comprising:
   a left wheel well and a right wheel well connected by a transverse support;
   at least one mount to a vehicle cabin frame;
   a second connection to a vehicle body panel or bumper; and
   a first crumple zone adjacent to the left wheel well and a second crumple zone adjacent to the right wheel well, wherein the first crumple zone and the second crumple zone comprise a ribbed "I" shaped section.

20. The integrated energy absorbing system of claim 19, wherein the integrated energy absorbing system is located in a front of the vehicle.

21. The integrated energy absorbing system of claim 20, wherein the at least one mount to the vehicle cabin frame is at a rear of the unitary cast metal part.

22. The integrated energy absorbing system of claim 20, wherein the second connection is mounted to a front bumper.

23. The integrated energy absorbing system of claim 19, wherein the integrated energy absorbing system is located in a back of the vehicle, and further comprising a rear undercarriage connecting the left wheel well and the right wheel well.

24. The integrated energy absorbing system of claim 1, wherein the integrated energy absorbing system is located in a back of the vehicle, and further comprising a rear undercarriage connecting the left wheel well and the right wheel well.

* * * * *